United States Patent [19]

Jensen

[11] Patent Number: 4,525,188
[45] Date of Patent: Jun. 25, 1985

[54] FIBER FORMING BUSHING AND METHOD FOR USING SAME

[75] Inventor: Thomas H. Jensen, Murrysville, Pa.

[73] Assignee: PPG Industries, Inc., Pittsburgh, Pa.

[21] Appl. No.: 609,040

[22] Filed: May 10, 1984

Related U.S. Application Data

[63] Continuation of Ser. No. 464,233, Feb. 7, 1983, abandoned.

[51] Int. Cl.³ .............................................. C03B 37/09
[52] U.S. Cl. .............................................. 65/1; 65/2; 65/172; 65/173
[58] Field of Search .................... 65/1, 2, 27, 172, 173

[56] References Cited

U.S. PATENT DOCUMENTS 2,294,266  8/1942  Barnard .
2,453,864  11/1948  Schlehr .
2,465,283  3/1949  Schlehr .
3,164,457  1/1965  Mitchell et al. .
3,278,282  10/1956  Jaray .
3,837,823  9/1974  Shealy .
3,988,135  10/1976  Coggin, Jr. .

Primary Examiner—Robert Lindsay
Attorney, Agent, or Firm—John E. Curley

[57] ABSTRACT

The invention involves a fiber glass bushing which is provided with a plurality of tubular feed inlets, through a top cover chamber, which by means of controlled introduction of a gaseous medium allows a gaseous void to be maintained above the glass level in the bushing. The gas void allows easy removal of the bushing from the forehearth and the tubes provide a means of stopping glass flow from forehearth during bushing removal without requiring severe cooling of the surrounding ceramics. Flexibility in glass feed to the bushing for optimum conditions is also possible.

10 Claims, 4 Drawing Figures

FIBER FORMING BUSHING AND METHOD FOR USING SAME

This a continuation of application Ser. No. 464,233, filed Feb. 7, 1983, abandoned.

The present invention relates to a novel structure of a fiber glass forming bushing which permits easy removal of the bushing for replacement or repair.

BACKGROUND OF THE INVENTION

In the manufacture of continuous glass fibers, glass batch ingredients are melted in furnaces. The molten glass resulting from the melting of the glass batch mixtures is then fed into elongated forehearths of various sizes and shapes. The molten glass flowing in the forehearths is removed at many locations positioned along the length of the forehearths from fiber glass forming bushings. In the typical fiber glass manufacturing operation, a glass level of predetermined height is maintained in the forehearth being fed by the glass furnace. These forehearths are normally constructed of ceramic materials resistant to molten glass attack and are frequently heated by combustion gases to maintain the molten glass during its passage through the forehearth at a given temperature. In some instances, electrodes can be used to supply electrical energy to the forehearth to maintain the temperature of the glass at a predetermined constant.

The molten glass, as stated above, is removed from the forehearth at bushing positions located along the forehearth. In a typical position in which a bushing is located a ceramic block, called a flow block, is positioned above the bushing and typically is provided with a cutout section sloping downwardly from the forehearth bottom. This sloped opening permits the molten glass to flow from the forehearth floor to the fiber glass bushing located beneath the flow block. The flow block is normally associated with a bushing block located directly below it and to which is attached a precious metal, fiber glass forming bushing. The bushing block, like the flow block, is typically a ceramic structure with a rectangular opening adapted to support the bushings attached to it. The bushings are generally rectangular containers open at the top to receive molten glass and made of a precious metal alloy, typically platinum-rhodium alloy. While rectangular shapes are normally employed other configurations have been used. Thus, circular bushings have been used as well as square and tubular bushings.

Whatever the shape, bushings contain a plurality of orifices on the bottom thereof. The orifices are arranged usually in rows and vary in diameter and number from bushing to bushing depending of the product strand being made by a given bushing. The fiber glass bushing itself is mounted, typically in a cast iron frame. The frame has within its confines a castable ceramic surrounding the bushing metal to electrically isolate it from the frame material since during operation the bushing is electrically heated to maintain a given, uniform temperature therein. A typical material for this use is described in detail in U.S. Pat. No. 3,164,457 at column 4 lines 30-37. The frame is bolted to the bushing block in the normal fashion. In U.S. Pat. No. 3,837,823 a general description of the mounting of a bushing in a bushing frame and bushing block is described in detail. This patent also shows in general an arrangement of a furnace or melter and the forehearth and bushing positions associated with it.

In the manufacture of glass fiber strands it is common for a given furnace feeding a forehearth to have positioned on that forehearth as many as 40 to 100 bushings. These bushings are subject to frequent replacement due to changing demands for products being made in the market place as well as for repairs caused by mechanical failures such as leaks or cracks occurring in the bushings. Thus, for example, a given forehearth can be operating with a plurality of bushings which are manufacturing a G75's strand. This would mean that the forehearth is operating with 400 hole bushings which manufacture strands having 400 glass filaments in each strand and in which each filament has a diameter of 0.00036 to 0.00039 inches. During the course of that manufacture, which can occur over several months, the demand may decrease for G75 fibers. At the same time an increase in demand for K15 fibers may occur. When this happens bushings must be changed to accommodate the changing requirements of the market place by replacing the bushings which manufacture the declining market strand with bushings capable of making the strand which is increasing in demand.

In order to change a fiber glass bushing on an operating forehearth it will be obvious to the skilled artisan that considerable difficulties are encountered in that the bushing is mounted to ceramic blocks which are in communication with molten glass contained in and continuously flowing in a forehearth. Thus, in order to remove a bushing from its position on a forehearth the bushing first has to have its electrical supply cut off. Once this is done the glass contained in the bushing itself is allowed to cool until it solidifies. The bushing and the associated ceramic blocks located above it must be chilled also to insure that the molten glass in the bushing block above the bushing itself has solidified prior to removal of the bushing from its bushing connection to the bushing block. When that glass i.e. the glass in the bushing block is solidified, the bushing may then be chiseled away from the bushing block. The chilling of bushing block and bushing is usually carried out by directing water onto the surfaces thereof for considerable periods of time. This causes thermal shock to the glass flowing in the forehearth in the vicinity of the position. The chiseling of the glass at the bushing-bushing block interface causes physical shock to the forehearth refractory in the vicinity of the position. These shocks cause thermal disturbance and contamination to occur in the glass flowing in the forehearth which has upsetting effects on adjacent bushing positions within the forehearth. In addition, the shock cooling of such large masses of glass and the subsequent mechanical operations which introduce physical as well as thermal shocks to the forehearth are time consuming as well as deleterious. Moreover they reduce the productive efficiency of the entire forehearth.

Because the above circumstances existent in the art today, a need persists in the art to provide it with a rapid, easy method of removing a bushing from a forehearth. Such a method is needed so that in the normal operation of a manufacturing plant frequent bushing changes can be made with a minimal disturbance to the thermal environment of the forehearths to which the bushings are attached. The method also is needed to minimize physical shock and damage to the surrounding ceramics to which the bushings themselves are attached during operation when a bushing change is made.

In accordance with the instant invention, a novel bushing is provided which satifies this requirement of the prior art. Its construction is such that it may be removed from service during a fiber glass continuous strand operation rapidly and with minimum effect on its surrounding environment.

SUMMARY OF THE INVENTION

In accordance with the instant invention, a method is provided which allows one to quickly remove a fiber glass forming bushing from an operating forehearth with a minimal amount of thermal and physical shock occurring to the molten glass in the forehearth or to the forehearth and bushing block structures associated with the bushing position. This is made possible by providing bushings which have separate covering members above the normal bushing structure. The cover members are provided with elongated, low volume glass transport means for the introduction of molten glass to the interior of the bushing. The bushings are constructed and arranged so that a gaseous fluid can be admitted to the interior of the bushing during its operation to establish an inert atmosphere at a given glass level maintained within the bushing. During the operation of the bushing the glass level is maintained more or less constant and below the upper sides of the bushing so that no leakage can occur through the flange of the bushing as will be apparent in the ensuing discussions.

The gaseous introduction means to the interior of the bushing and the supply of gas is such that gas flow can be regulated during bushing operation and may also be regulated to the extent that when a bushing change is required gas pressure in the interior of the bushing can be increased to a point where the glass level existent in a bushing can be lowered to a point close to or below the glass introduction level to the bushing. When the glass level is lowered to such a point the glass contained within the bushing itself and the glass contained in the bushing feed conduits can be solidified or frozen in place by discontinuing the normal electrical heat supply to the bushing. In this manner, only small quantities of glass need to be solidified for the bushing to be removed from the forehearth since the glass in the feed tubes is the only glass which needs to be cooled and will cool naturally when the bushing power is turned off.

The invention thus involves the utilization of a bushing comprised of a normal bushing, open at the top and having a plurality of orifices located on the bottom with a flange member surrounding it at the top that forms the sealing surface of the bushing when it is coupled to the bushing block. The bushing bottom is electrically heated and for this purpose is provided with terminal ears for connection to a suitable electrical source. A closure member or top, separate from the bushing, is located above the bushing and constructed and arranged to mate with the conventional bushing to form a closure for the bushing. The closure member or top is provided with one or more tubular members depending from the top and terminating slightly above the bottom of the bushing when the closure member is in place above the bushing. These tubular members define the level within the bushing at which glass is introduced thereto and have a small cross sectional area in comparison to the total sectional area of the bushing opening. In between a flange member provided around the periphery of the top member and the flange member of the bottom there is positioned a sealant material which is both thermally and electrically insulating in nature and is more or less gas impervious. On one side of the bushing at this flange interface a probe element is embedded which allows the glass level in the bushing to be monitored continuously during its operation as will be more fully discussed in connection with the discussion of the drawings.

BRIEF DESCRIPTION OF THE DRAWINGS

Reference is made to the accompanying drawings in which.

DETAILED DESCRIPTION OF THE DRAWINGS

Figure 1:
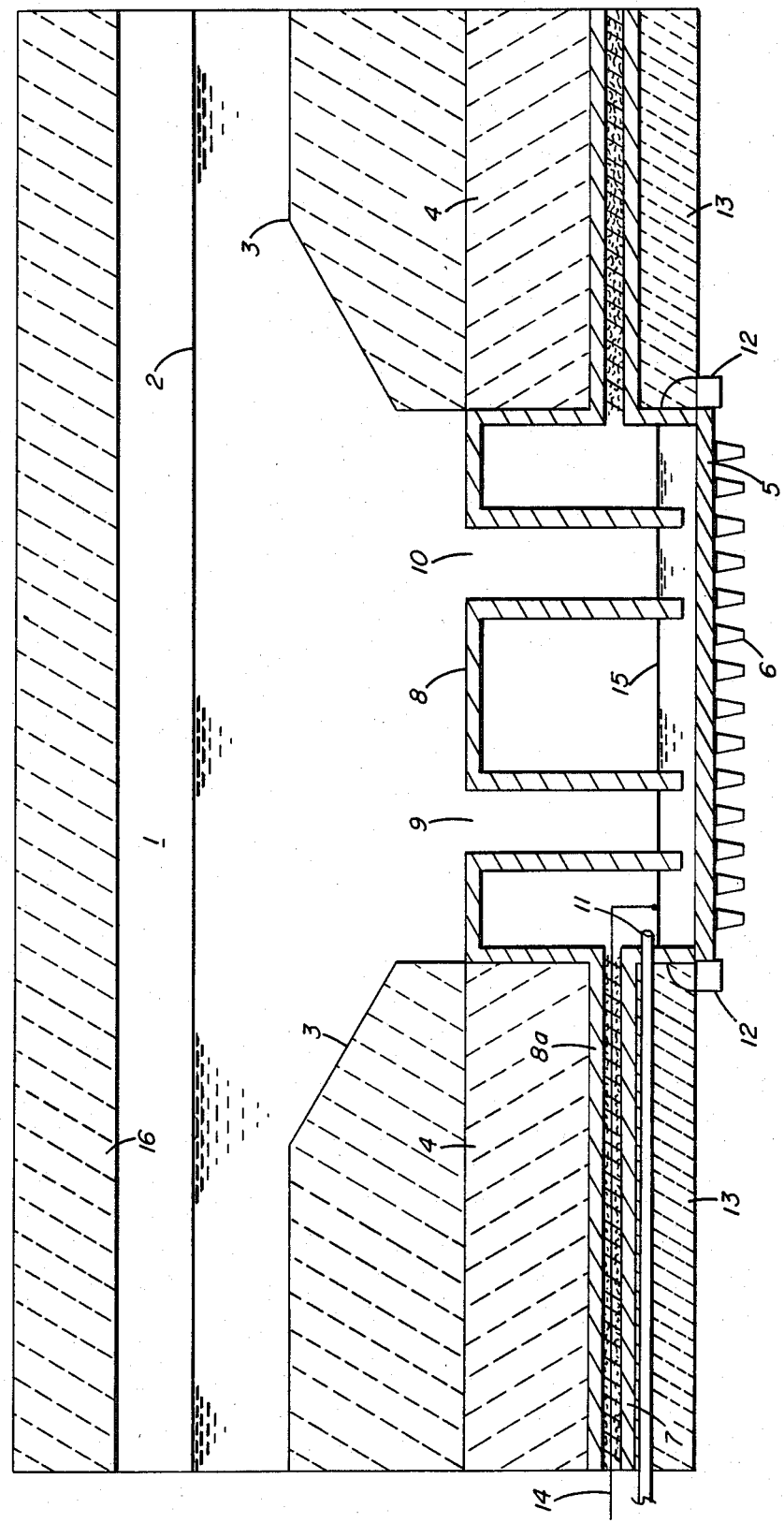
FIG. 1 is a side elevational view of the bushing and bushing closure of the instant invention positioned on a glass fiber forming forehearth.
Figure 2:
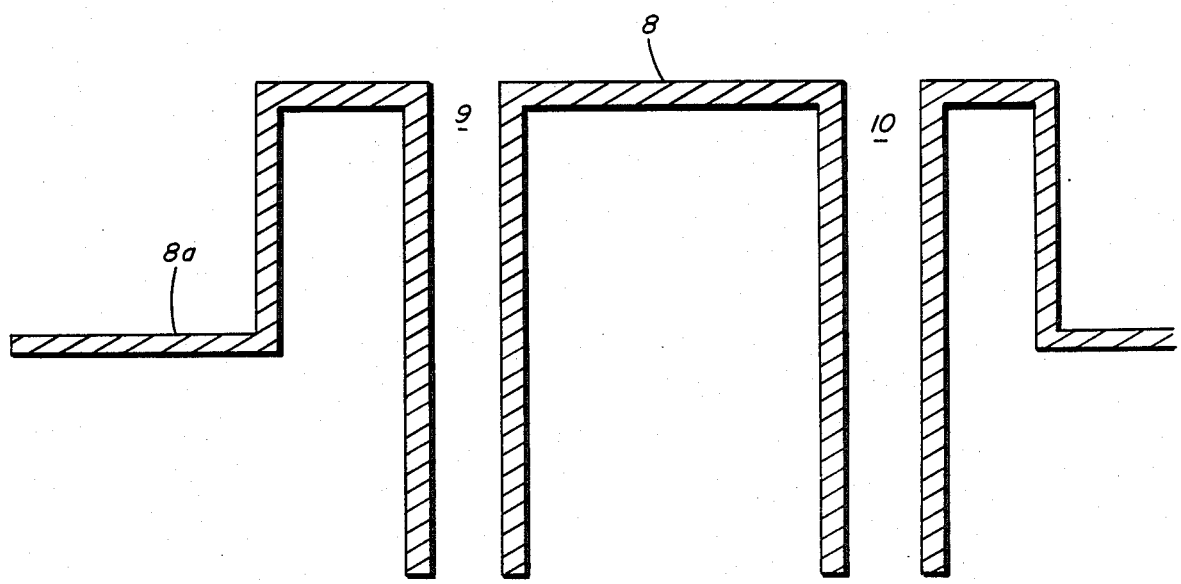
FIG. 2 is a side elevation view in cross section of the top member of the bushing shown in FIG. 1.

Turning now to FIG. 1 there is shown a forehearth generally indicated at 1 containing molten glass. The glass level in indicated by the number 2. Located below the glass level 2 is the flow block 3 which is constructed of ceramic materials such as chrome oxide, zirconium oxide and the like. The block 3 is sloped downwardly to provide ease of flow of the molten glass to the bushing closure member or top 8. Below the flow block 3 is the bushing block 4. Attached to the bushing block 4 is the cover member 8 which forms an integral part of the bushing assembly of the instant invention. The closure member 8 is provided with two openings 9 and 10 for the admission of molten glass to the interior of the bushing 5 which will be described hereinafter in more detail. The closure member or cover 8 is also provided with a flange member around its side walls, shown as 8a.

Located below the closure member 8 is the bushing indicated generally by the numeral 5. The bushing 5 is provided at its lower extremity with a plurality of tips 6 through which the molten glass flows to form the glass fibers. The bushing 5 is also provided with a flange member 7 which is supported by the ceramic 13 forming part of the bushing frame assembly not shown in its entirety. The side walls of the bushing are provided with terminal ears 12 for connection to a suitable electric source to provide electrical current to the bushing 5 and maintain the glass contained therein in the molten state. As shown in FIG. 1 the bushing 5 has a glass level 15 maintained therein. This glass level 15 is monitored by the probe 14 shown traversing insulation material 17 positioned between the flange 8a and the flange member 7 of bushing 5.

Located below the flange 7 and running through the ceramic body 13 is a tubular member 11 utilized for the admission of the interior of the assembled bushing (i.e. top and bottom members 8 and 5 respectively joined at their respective flanges 8a and 7) of suitable gaseous fluid.

Figure 3:
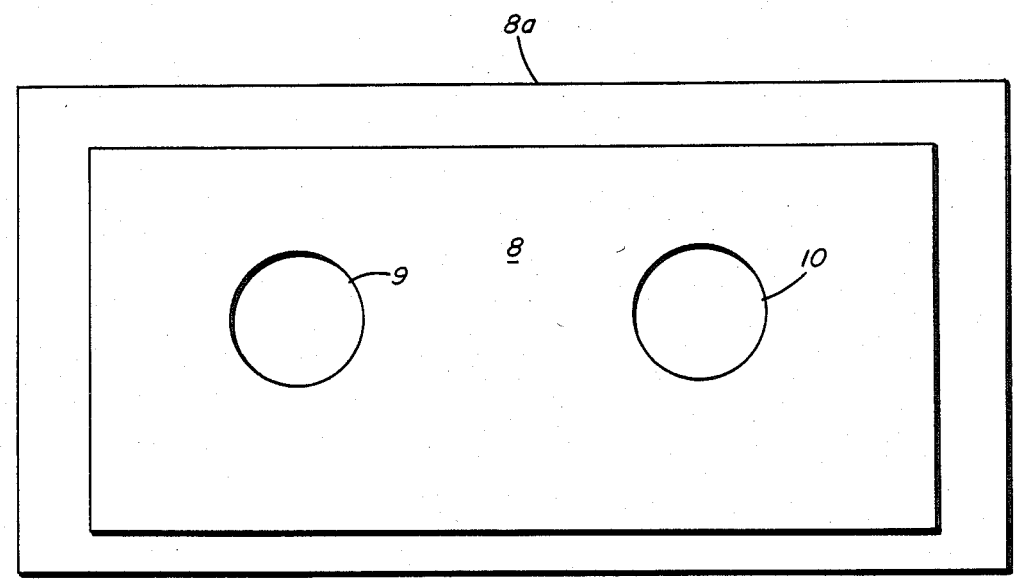
FIG. 3 is a plan view of the top member shown in FIG. 2.
Figure 4:
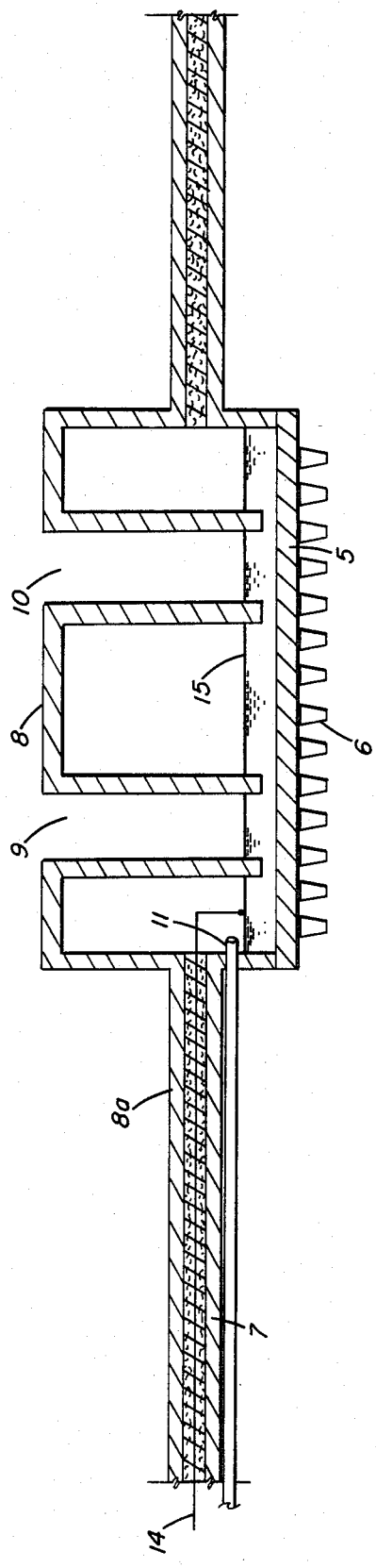
FIG. 4 is a side elevation of the bushing and bushing closure with the ceramic structures of FIG. 1 removed.

The tubular members 9 and 10 which admit glass to the bushing are shown in FIG. 3 to be circular in configuration. This is for convenience only and they may be any suitable shape and in any desired position and number. The gasket material 17 located between flange 8a and flange 7 is shown in the open state to indicate it is fibrous in the preferred embodiment but it is to be understood that it is shown in that state for ease in depicting the various members including the probe shown. In actual operation the ceramic bodies 13 and the flange 7 of the bushing abut against the flange 8a of the closure member compressing the gasket material 17 to provide a seal between the flange 7 and the flange 8a. A preferred material is "Fiberfrax" an aluminum oxide-silica, fibrous material manufactured by Carborundum Corporation which is capable of withstanding temperatures of 2500° F. This seal prevents any substantial leakage of gaseous fluid from the interior of the bushing during operation. Air or other gaseous fluid such as $N_2$, $CO_2$ and the like can be admitted through the tube 11 into the interior of the bushing and a gas pressure is maintained in the bushing during operation using suitable pumping equipment.

In actual operation the bushing 5 is assembled in the manner shown in FIG. 1 with the bushing held firmly against the upper section 8. Gasket material 17 is compressed during assembly to an extent sufficient to produce a minimal leakage of gas through the flange areas 7 and 8 of the top member 8 and the bushing 5 respectively. In this manner, a gas pressure sufficient to support the glass head above the bushing can be maintained with minimal gas flow into the bushing. Glass level 15 in the bushing is maintained by the probe 14 which senses minute variations in glass level in the bushing 5 and provides the appropriate signals to the gas supply system so that the glass flow through the tubes 9 and 10 can be modulated to maintain the desired glass level. When it is desired to remove the bushing 5 from service the gas pressure inside the bushing 5 can be increased by increasing gas flow into the bushing interior. The glass level 15 will be driven preferably to a point close to or at a level with the ends of the tubes 9 and 10. By "close to" is meant within 1/16 inch of the end of the tubes 9 and 10 in the bushing 5. When the glass level is lowered to this point or lower, passage of electrical current to the bushing through the terminal ears 12 is discontinued and the glass contained in the tubes 9 and 10 cools and becomes solidified therein thus blocking the molten glass contained in the forehearth 1 and bushing block 4 from entering the bushing 5. Once this has been accomplished and the glass within the bushing 5 has frozen, the bushing 5 may be unbolted from the top member 8 and removed without recourse to cooling the glass up in the bushing block 4 area as was practiced heretofore. Thus, in a relatively short period of time the bushing 5 can be isolated from the forehearth 1 and removed and replaced with a new bushing which can be simply bolted into place against the flange 8a of the top member 8. The electricity can be supplied to the new bushing to provide sufficient heat to cause the glass contained in the columns 9 and 10 to remelt and flow into the new bushing.

The bushing 5 and the bushing top 8 are preferably constructed of platinum or a platinum-rhodium alloy as commonly used in the art. These alloys are typically 90-10 to 80-20 platinum to rhodium. No particular significance with respect to the instant invention is to be given to the number of bushing tips 6 contained on a given bushing or their particular configuration in the bushing. The invention relates to any normal fiber glass bushing utilized to produce glass fiber on a continuous basis regardless of the material of construction or number of tips.

An important consideration of this invention is the provision for a top member 8 being provided for a normal bushing and the use of restricted cross sectional area feed conduits provided in such a top 8 for the admission of molten glass to the interior of the bushing in low, controlled volumes. This novel construction of a top and bottom piece for a bushing and the maintenance of a glass level in the bushing below the level of the sides of the bushing so that glass is not permitted to "cement" the flanges 7 of the bushing 5 and 8a of the closure member 8 make it possible to accomplish the results described.

Since forehearth systems presently used, because of their large rectangular shaped flow of glass into the bushings effectively couple the bushings thermodynamically, to the forehearths, glass temperatures have a dominant influence on bushing temperature conditions which may or may not be optimal. A second advantage of this invention is that the tubular feeders in the closures or tops used herein may be placed in any desired pattern and number within bushing to create a desired glass flow pattern which will promote more optimum bushing tip plate temperatures than might otherwise be possible. The result is a means by which bushing tip plate temperatures or glass flow can be made more uniform by design.

It is necessary in accordance with the invention to provide for the admission of gases to the bushing proper to supply any gas leakage losses through the flange seal and to maintain sufficient pressure within the tubular member 11 to support the glass head above the bushing to thereby maintain a constant glass level therein at any desired height. The bushing probe is typically connected to suitable instrumentation to provide for automatic response of gas introduction to the interior of the bushing when glass levels fluctuate in an up or down mode. Thus, the probe can be connected to instrumentation to produce signals in response to a rise or fall in the level of the glass. These signals can be used with standard control circuitry to adjust gas flow to cause an increase in the quantity of gas admitted to the interior of the bushing in case of a rise or a decrease in the quantity of gas in the bushing in response to a lowering of the level of the probe.

Obviously the design of the feed tubes and level control circuitry must be such that the variation in flow of molten glass through the feed tubes will be minimized to thereby minimize changes in glass flow from the bushing orifices. The number and size of the feed tubes in the cover member, however, can be subject to considerable variations. In a practical sense for purposes of providing rapid solidifying of glass in these feed tubes, diameters are generally not greater than one inch since the smaller of mass of glass in a tube that has to be cooled during a change, the better the cooling rate and consequently, the faster the bushing change can be made.

While the invention has been described with reference to certain specific embodiments it is, of course, not intended to be limited in that way except insofar as appears in the accompanying claims.

I claim:

1. A method of operating a glass fiber forming bushing comprising introducing molten glass to the bushing through a constricted tubular inlet, providing a space in said bushing above the molten glass inlet, introducing a gas above the molten glass inlet and establishing a gas pressure above said glass inlet of sufficient force to maintain the glass level in said bushing below the sealing flange of said bushing and above the level of the said inlet, increasing the pressure in said space when the bushing is to be changed to lower the level of glass in the bushing to a point close to or at the lower level of said inlet, cooling the bushing when the glass level is at said point to thereby solidify the glass therein and removing the bushing when the glass in the bushing has solidified.

2. In a glass fiber forming bushing comprising a container for receiving molten glass including a bottom member having a plurality of orifices therein, four side members and an open top for receiving molten glass the improvement comprising a closure structure positioned above said container having at least one opening therein for the introduction thereto of molten glass, at least one tubular member contiguous with said opening and extending downwardly into said container to a level above the level of the bottom members and below the level of said sides, means to introduce gas below said closure member and above said container, means to establish pressure in a space provided between said closure and said container to thereby apply pressure to the surface of molten glass introduced into said container and means to cool molten glass in said container when desired.

3. The apparatus of claim 2 wherein cooling means are provided adjacent said tubular member.

4. The apparatus of claim 2 wherein the temperature of the container is controlled electrically.

5. A glass fiber forming bushing comprising a container open at the top and having a bottom with a plurality of orifices located thereon, four sides members attached to said bottom, the flange member attached to said side members, a closure member for said bushing including a flange member a cover member having at least two orifices therein with contiguous tubes running from said orifices downwardly from the top, four side members, said closure member being constructed and arranged to mate with a ceramic bushing block at the sides and at the flange members, means positioned between said closure member and said bushing member to seal the closure member and bushing into a unitary container at the flanges, means in said bushing to introduce a gaseous fluid thereto above the level of said tubular members, means located within the bushing structure to measure glass levels therein and means to electrically heat the bushing member to maintain glass container in a molten state when electricity is being supplied to bushing, and means to introduce sufficient pressure to said bushing to maintain glass level at any given height inside of said bushing.

6. The apparatus of claim 5 wherein a probe member is positioned between the flange of the bushing and the flange of the closure member.

7. The apparatus of claim 5 wherein gas is introduced in a tubular member located in a ceramic block on which the bushing member, flange and side walls are mounted.

8. The apparatus of claim 5 wherein the closure member has two tubular members extending downwardly to a point above the bushing bottom from said orifices.

9. A method of operating a glass fiber forming bushing comprising introducing molten glass to the bushing through a constricted tubular inlet, establishing a glass head in the bushing, correlating the withdrawal of glass and the introduction of glass to maintain the glass head inside of the bushing below the bushing flange, decreasing the glass head in the bushing when it is to be changed to lower the level of glass in the bushing to a point close to or at the lower level of said inlet, cooling the bushing when the glass level is at said point to thereby solidify the glass in the constricted member and removing the bushing when the glass in the bushing has solidified.

10. The method of claim 1, wherein the glass level is continuously monitored during operation of the bushing.

* * * * *